United States Patent
Thomas et al.

(10) Patent No.: US 11,085,318 B1
(45) Date of Patent: Aug. 10, 2021

(54) TURBINE SHROUD ASSEMBLY WITH MULTI-PIECE SUPPORT FOR CERAMIC MATRIX COMPOSITE MATERIAL SEAL SEGMENTS

(71) Applicant: Rolls-Royce Corporation, Indianapolis, IN (US)

(72) Inventors: David J. Thomas, Brownsburg, IN (US); Jeffrey A. Walston, Indianapolis, IN (US); Aaron D. Sippel, Zionsville, IN (US); Daniel K. Vetters, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 42 days.

(21) Appl. No.: 16/745,975

(22) Filed: Jan. 17, 2020

(51) Int. Cl.
*F01D 11/08* (2006.01)
*F01D 25/24* (2006.01)
*F01D 25/28* (2006.01)

(52) U.S. Cl.
CPC .............. *F01D 11/08* (2013.01); *F01D 25/24* (2013.01); *F01D 25/28* (2013.01); *F05D 2220/32* (2013.01); *F05D 2240/55* (2013.01); *F05D 2260/30* (2013.01); *F05D 2300/6033* (2013.01)

(58) Field of Classification Search
CPC .......... F01D 11/08; F01D 25/24; F01D 25/28; F01D 2300/6033; F05D 2220/32; F05D 2240/55; F05D 2260/30
See application file for complete search history.

(56) References Cited

U.S. PATENT DOCUMENTS

| | | |
|---|---|---|
| 8,647,055 B2 | 2/2014 | Foster et al. |
| 8,740,552 B2 | 6/2014 | Marusko et al. |
| 8,753,073 B2 | 6/2014 | Albers et al. |
| 8,790,067 B2 | 7/2014 | McCaffrey et al. |
| 8,834,105 B2 | 9/2014 | Albers et al. |
| 8,905,709 B2 | 12/2014 | Dziech et al. |
| 9,127,569 B2 | 9/2015 | Akiyama et al. |
| 9,175,579 B2 | 11/2015 | Franks et al. |
| 9,726,043 B2 | 8/2017 | Franks et al. |
| 10,087,784 B2 | 10/2018 | Shapiro et al. |
| 10,196,919 B2 | 2/2019 | O'Leary et al. |
| 2012/0171027 A1* | 7/2012 | Albers .................. F01D 11/005 415/208.1 |
| 2016/0097303 A1 | 4/2016 | Baldiga et al. |
| 2016/0333715 A1 | 11/2016 | McCaffrey |
| 2016/0376901 A1* | 12/2016 | O'Leary .................. F01D 9/02 415/116 |
| 2017/0101882 A1 | 4/2017 | Sippel et al. |
| 2017/0130600 A1 | 5/2017 | Shapiro et al. |
| 2018/0106160 A1 | 4/2018 | Thomas et al. |
| 2018/0149030 A1* | 5/2018 | Freeman ............... F01D 11/005 |
| 2018/0149041 A1* | 5/2018 | Freeman ............... F01D 25/246 |
| 2018/0149042 A1* | 5/2018 | Freeman ............... F01D 11/005 |
| 2019/0107001 A1 | 4/2019 | Crutchfield |
| 2019/0107002 A1 | 4/2019 | Crutchfield |

* cited by examiner

*Primary Examiner* — Igor Kershteyn
(74) *Attorney, Agent, or Firm* — Barnes & Thornburg LLP

(57) ABSTRACT

An assembly adapted for use in a gas turbine engine or other engine has a carrier component and a blade track segment. The assembly includes a mounting system for coupling the blade track segment to the carrier component. In an illustrative embodiment, the assembly is a turbine shroud segment for blocking gasses from passing over turbine blades included in the gas turbine engine.

20 Claims, 3 Drawing Sheets

TURBINE SHROUD ASSEMBLY WITH MULTI-PIECE SUPPORT FOR CERAMIC MATRIX COMPOSITE MATERIAL SEAL SEGMENTS

FIELD OF THE DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional fasteners such as rivets or bolts may present problems due to thermal expansion and/or material properties of the ceramic matrix composite components.

SUMMARY

The present disclosure may comprise one or more of the following features and combinations thereof.

A turbine shroud segment adapted for use in a gas turbine engine may include a carrier segment, a blade track segment, and a mounting system. The carrier segment may comprise metallic materials. The blade track segment may comprise ceramic matrix composite materials. The mounting system may be configured to couple the blade track segment to the carrier segment.

In some embodiments, the blade track segment may be formed to include a runner and an attachment. The runner may be shaped to extend partway around a central axis. The attachment may extend radially outward from the runner relative to the central axis.

In some embodiments, the attachment may have a first radial wall, a second radial wall, and an attachment panel. The first radial wall may extend radially outward from the runner. The second radial wall may be spaced apart axially from the first radial wall and extend radially outward from the runner. The attachment panel may extend axially between the first radial wall and the second radial wall to define a channel.

In some embodiments, the mounting system may include a brace, a fastener, and a spring seal. The brace may be located in the channel of the attachment and may be configured to distribute coupling and pressure loads applied to the blade track segment. The fastener may extend through the carrier segment and the attachment panel into the channel and mate with the brace to couple the blade track segment to the carrier segment. The spring seal may be arranged between the carrier segment and the attachment of the blade track segment and may be engaged with the first and second radial walls of the attachment to block gases from flowing between the carrier segment and the blade track segment.

In some embodiments, the carrier segment may include a plurality of locating pads. The plurality of locating pads may each extend radially inwardly through corresponding radially-opening apertures formed in the spring seal to directly contact the blade track segment and radially locate the blade track segment relative to the brace.

In some embodiments, the attachment panel of the blade track segment may be shaped to include a plurality of locating slots. The plurality of locating slots may each extend radially into a radially-outwardly facing surface of the attachment panel. The plurality of locating slots may be sized to provide locating surfaces for the plurality of locating pads.

In some embodiments, the spring seal may include an outer panel, a first spring arm, and a second spring arm. The outer panel may be arranged radially outward of the attachment panel. The first spring arm may extend radially inward from the outer panel and engage the first radial wall of the attachment of the blade track segment. The second spring arm may extend radially inward from the outer panel opposite the first spring arm and engage the second radial wall of the attachment of the blade track segment.

In some embodiments, the outer panel of the spring seal may be shaped to include the radially-opening apertures. In some embodiments, one of the radially-opening apertures may be sized to receive the fastener and one locating pad of the plurality of locating pads.

In some embodiments, the plurality of locating pads may be spaced circumferentially from one another about the central axis. In some embodiments, at least one locating pad may spaced axially from another locating pad along the central axis. In some embodiments, the plurality of locating pads may include at least three locating pads.

In some embodiments, the carrier segment may include a body plate. The body plate may extend at least partway about the central axis.

In some embodiments, the body plate may be shaped to define a radially-inwardly opening cavity. The radially-inwardly opening cavity may receive the attachment of the blade track segment and the spring seal.

According to another aspect of the present disclosure, the turbine shroud segment adapted for use in a gas turbine engine may include a carrier segment, a blade track segment, and a mounting system. The mounting system may be configured to couple the blade track segment to the carrier segment.

In some embodiments, the blade track segments may be formed to include a runner and an attachment. The runner may be shaped to extend partway around a central axis. The attachment may be shaped to define a channel that extends at least partway about the central axis.

In some embodiments, the mounting system may include a brace, a fastener, and a spring seal. The brace may be located in the channel of the attachment and configured to distribute coupling and pressure loads applied to the blade track segment. The fastener may extend radially through the carrier segment and the attachment into the channel and couple to the brace to couple the blade track segment to the carrier segment. The spring seal may arranged between the carrier segment and the attachment of the blade track segment.

In some embodiments, the carrier segment may include a plurality of locating pads. The plurality of locating pads may each extend radially inwardly through corresponding radially-opening apertures in the spring seal. The plurality of locating pads may extend through the apertures to directly contact the blade track segment and radially locate the blade track segment relative to the brace.

In some embodiments, the attachment of the blade track segment may include a first radial wall, a second wall, and an attachment panel. The first radial wall may extend radially outward from the runner. The second radial wall may be spaced apart axially from the first radial wall and extend radially outward from the runner. The attachment panel may extend axially between the first and second radial walls to define the channel.

In some embodiments, the attachment panel of the blade track segment may be shaped to include a plurality of locating slots. The plurality of locating slots may each extend radially into a radially-outwardly facing surface of the attachment panel. In some embodiments, the plurality of locating slots may be sized to provide locating surfaces for the plurality of locating pads.

In some embodiments, the spring seal may include an outer panel, a first spring arm, and a second spring arm. The outer panel may be arranged radially outward of the attachment panel. The first spring arm may extend radially inward from the outer panel and engage the first radial wall of the attachment of the blade track segment. The second spring arm may extend radially inward from the outer panel opposite the first spring arm and engage the second radial wall of the attachment of the blade track segment.

In some embodiments, the outer panel of the spring seal may be shaped to include the radially-opening apertures. In some embodiments, the plurality of locating pads may be spaced circumferentially from one another about the central axis.

In some embodiments, at least one locating pad may be spaced axially from another locating pad along the central axis. In some embodiments, the plurality of locating pads may include at least three locating pads.

According to another aspect of the present disclosure, a method may include providing a carrier segment, a blade track segment, and a mounting system. The mounting system may be configured to couple the blade track segment to the carrier segment.

In some embodiments, the blade track segment may include a runner and an attachment portion. The runner may be shaped to extend partway around a central axis. The attachment portion may extend radially outward from the runner.

In some embodiments, the mounting system may include a brace, a fastener, and a spring seal. The method may include arranging the brace of the mounting system in a channel formed by the attachment portion of the blade track segment, arranging the spring seal around the attachment portion of the blade track segment, and arranging the attachment portion of the blade track segment with the spring seal in an attachment portion receiving space formed in the carrier segment.

In some embodiments, the method further includes inserting the fastener through the carrier segment, the spring seal, and the attachment portion of the blade track segment and into the channel, and coupling the fastener with the brace in the channel. The fastener is coupled to the brace in the channel to extend locating pads formed in the carrier segment through radially-opening apertures in the spring seal so that the locating pads engage the attachment portion of the blade track segment.

In some embodiments, the attachment portion of the blade track segment may include a first radial wall, a second radial wall, and an attachment panel. The first radial wall may extend radially outward from the runner. The second radial wall may be spaced apart axially from the first radial wall and extend radially outward from the runner. The attachment panel may extend axially between the first and second radial walls to define the channel.

In some embodiments, the attachment panel of the blade track segment may be shaped to include a plurality of locating slots. The plurality of locating slots may each extend radially into a radially-outwardly facing surface of the attachment panel. In some embodiments, the plurality of locating slots may be sized to provide locating surfaces for the locating pads.

These and other features of the present disclosure will become more apparent from the following description of the illustrative embodiments.

DETAILED DESCRIPTION OF THE DRAWINGS

Figure 1:
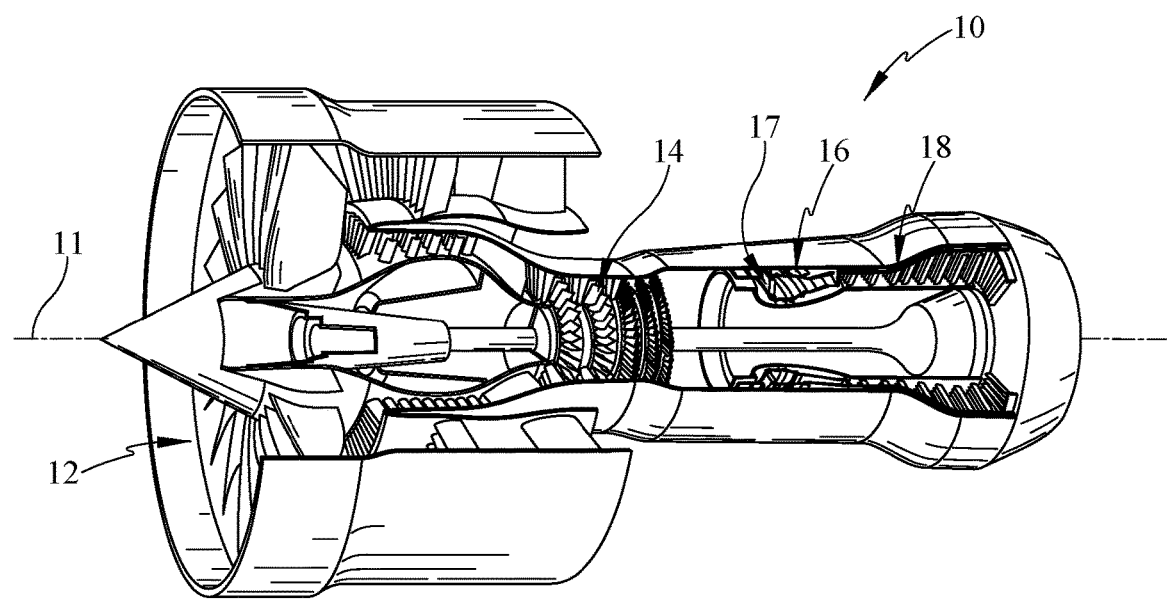
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

Figure 2:
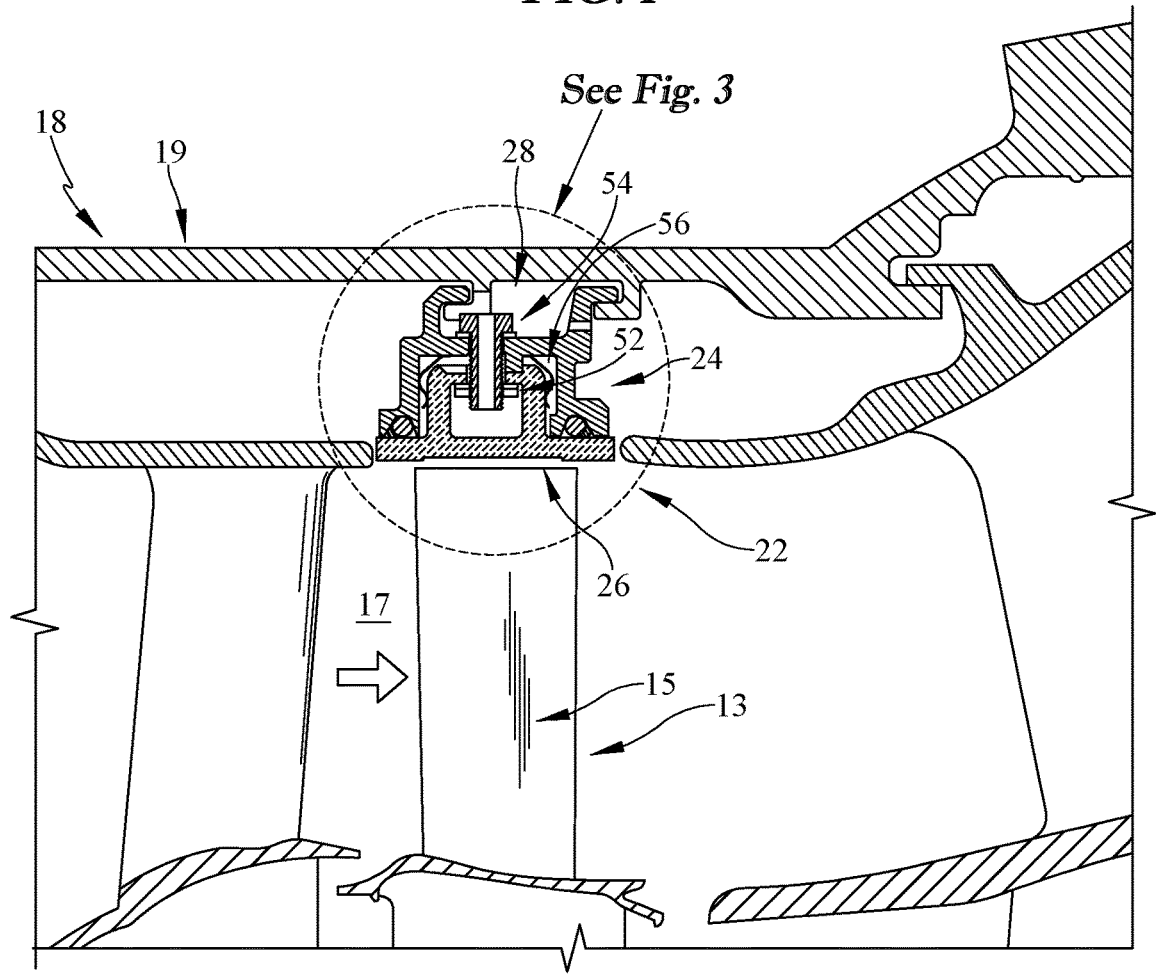
FIG. 2 is a partial cross-sectional view of the gas turbine engine of FIG. 1 showing the arrangement of a segmented turbine shroud radially outward from blades of a turbine wheel assembly to suggest that the turbine shroud blocks gasses from passing over the blades without interacting with the blades.
Figure 3:
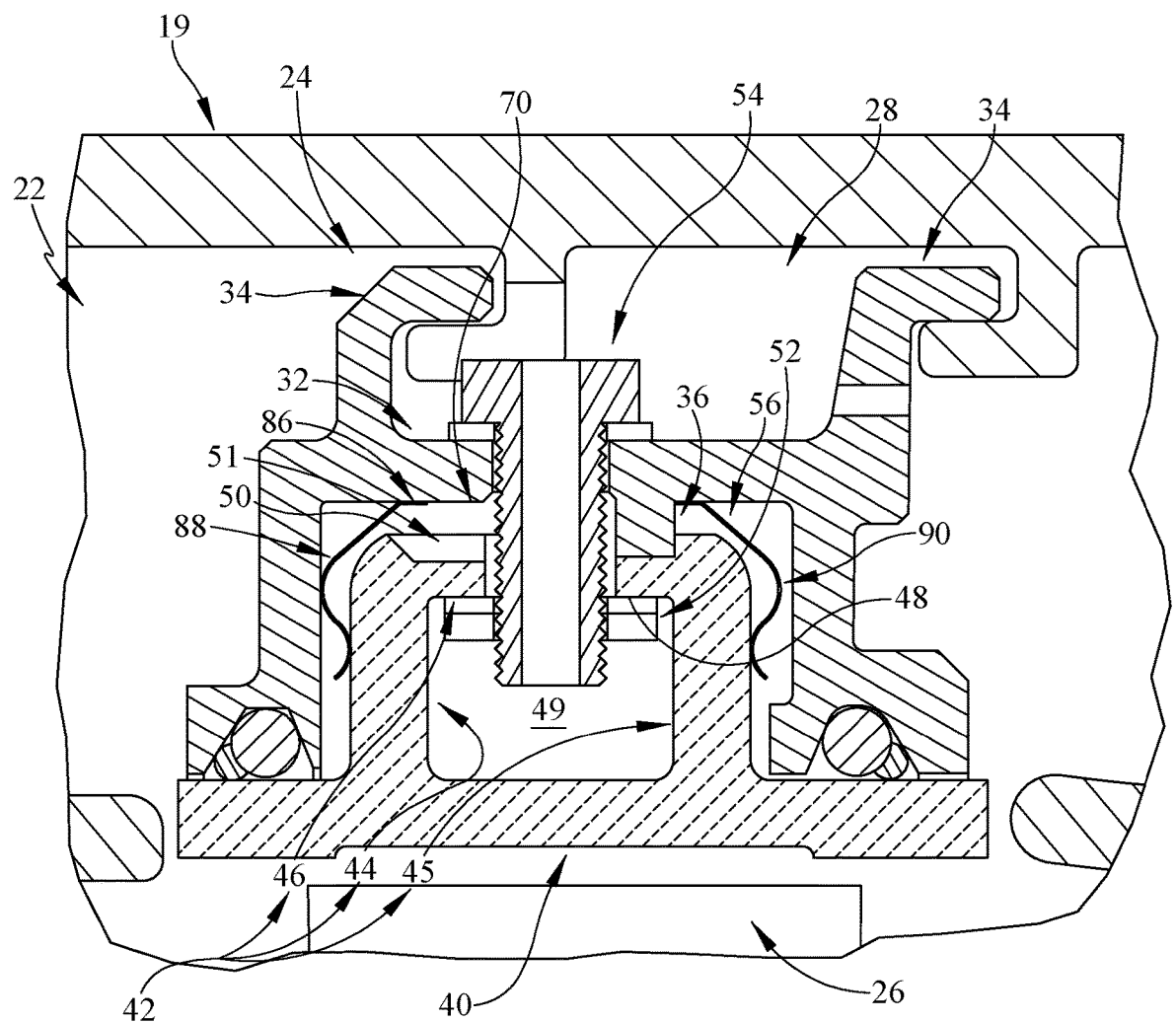
FIG. 3 is a detail view of a portion of FIG. 2 showing a turbine shroud segment that includes a carrier segment, a blade track segment made from ceramic matrix composite materials, and a mounting system for coupling the blade track segment to the carrier segment, and showing that the mounting system is provided by a multi-piece support for holding the blade track segment relative to the case.
Figure 4:
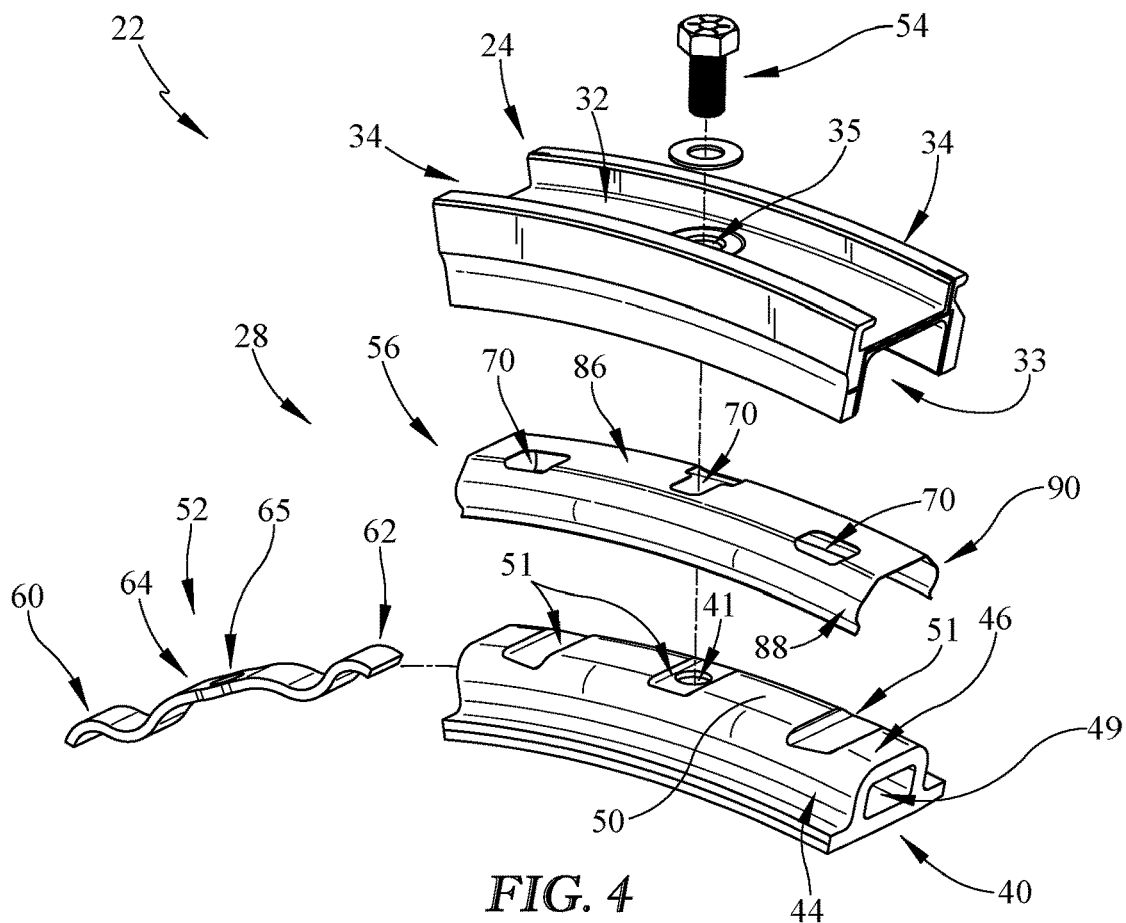
FIG. 4 is an exploded perspective assembly of the turbine shroud segment of FIGS. 2 and 3 showing that the mounting system includes—generally from top to bottom—a fastener, a brace, and a spring seal.

A turbine shroud segment 22 adapted for use in a gas turbine engine 10 is shown in FIGS. 2-4. The turbine shroud segment 22 includes a carrier segment 24, a blade track segment 26, and a mounting system 28 configured to couple the blade track segment 26 to the carrier segment 24 as shown in FIGS. 2-5. The carrier segment 24 is a metallic support component configured to interface with other metallic components of the gas turbine engine 10. The blade track segment 26 is a ceramic matrix composite component configured to directly face the high temperatures of a primary gas path 17 of the gas turbine engine 10. The mounting system 28 is designed to engage the blade track segment 26 so as to couple the blade track segment 28 to the carrier segment 24 and distribute mounting and pressure loads.

The mounting system 28 includes a brace 52, a fastener 54, and a spring seal 56 as shown in FIGS. 2-5. The brace 52 is configured to distribute coupling and pressure loads applied to the blade track segment 26. The fastener 54 extends through the carrier 24 and blade track segment 26 and engages the brace 52 to fix the brace 52 in place and to apply coupling load to the blade track segment 26 through the brace 52. The spring seal 56 extends around an attachment portion 42 of the blade track segment 26 and engages the blade track segment 26 to seal the interface at the fastener 54.

Figure 5:
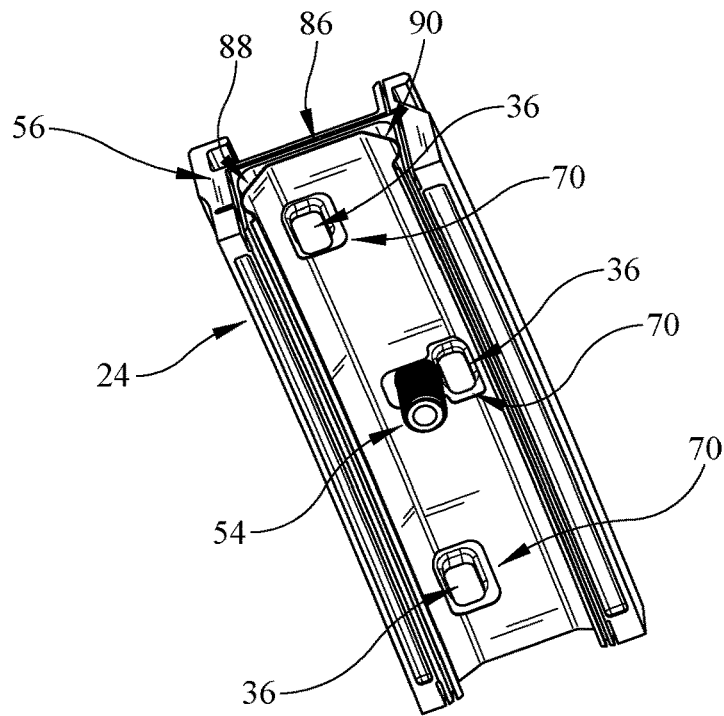
FIG. 5 is a perspective view of the carrier of FIG. 4 showing that the carrier includes locating pads that extend radially inwardly through apertures formed in the spring seal to directly contact the blade track segment.

The spring seal 56 is shaped to include radially-opening apertures 70 as show in FIGS. 4 and 5. The radially-opening apertures 70 are sized to receive locating pads 36 of the carrier segment 24 so that the locating pads 36 may extend through the spring seal 56 and contact the blade track segment 26. The locating pads 36 directly contact the blade track segment 26 to radially locate the blade track segment 26.

In the illustrative embodiment, the locating pads 36 extend through or "nest" in the apertures 70 in the spring seal 56 as shown in FIGS. 2 and 5. The "nesting" arrangement of the locating pads 36 in the apertures 70 may reduce the radial space claim of the turbine shroud segment 22, while also allowing the load path to be centered on the carrier segment 24. This in turn may reduce and/or eliminate the rigid body motion of the segment 22.

Turning again to the gas turbine engine, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

The turbine 18 includes at least one turbine wheel assembly 13 and the turbine shroud segment 22 positioned to surround the turbine wheel assembly 13 as shown in FIGS. 1 and 2. The turbine shroud segment 22 is coupled to an outer case 19 of the gas turbine engine 10. The turbine wheel assembly 13 includes a plurality of blades 15 coupled to a rotor disk for rotation therewith. The hot, high pressure combustion products from the combustor 16 are directed toward the blades 15 of the turbine wheel assemblies 13 along the gas path 17. The blades 15 are in turn pushed by the combustion products to cause the turbine wheel assembly 13 to rotate; thereby, driving the rotating components of the compressor 14 and/or the fan 12.

In the illustrative embodiment, the turbine shroud segment 22 is one of a number of shroud segments 22 that form a turbine shroud of the turbine 18. Each turbine shroud segment 22 extends only partway around the central axis 11 and cooperates with the other segments 22 to surround the turbine wheel assembly 13 to block combustion products from passing over the blades 15 without pushing the blades 15 to rotate as suggested in FIG. 2. The shroud segments 22 are sealed against one another, such as by strip seal members, to provide a continuous turbine shroud.

Each shroud segment 22 includes the carrier segment 24, the blade track segment 26, and the mounting system 28 as shown in FIGS. 2-4. In other embodiments, the turbine shroud 22 is annular and non-segmented to extend fully around the central axis 11 and surround the turbine wheel assembly 13. In yet other embodiments, certain components of the turbine shroud 22 are segmented while other components are annular and non-segmented.

The carrier segment 24 included in each shroud segment 22 is coupled to the case 19 of the engine 10 as shown in FIG. 2. Each carrier segment 24 illustratively includes a body plate 32, hangers 34, and locating pads 36 as shown in FIGS. 3 and 4. The body plate 32 extends partway around the axis 11. The hangers 34 extend radially outward from the body plate 32 and engage the case 19 to couple the turbine shroud segment 22 to the rest of the engine 10.

The body plate 32 is shaped to body plate is shaped to define a radially-inwardly opening cavity 33 and a hole 35 as shown in FIG. 4. The radially-inwardly opening cavity 33 receives the attachment 42 of the blade track segment 26 and the spring seal 56. The hole 35 extends radially through the body plate 32. In the illustrative embodiment, the mounting system 28 extends through the hole 35.

In the illustrative embodiment, three locating pads 36 extend radially inward from the body plate 32 through the apertures 70 in the spring seal 56 and contact the blade track segment 26 to help locate the blade track segment 26 relative to the carrier segment 24. The locating pads 36 may be machined to help place the blade track segment 26 in a desired orientation relative to the carrier segment 24.

In the illustrative embodiment, the locating pads 36 are all spaced circumferentially from one another about the central axis 11. At least one locating pad is spaced axially from another locating pad along the central axis 11. In this way, the fastener 54 attaches the blade track segment 26 to the carrier segment 24 in the center of the attachment portion 42 so that the load path to be centered on the carrier segment 24. In other embodiments, the carrier segment 24 may include more than three locating pads 36 that are spaced apart circumferentially and axially along the central axis 11.

The blade track segment 26 of each shroud segment 22 comprises ceramic matrix composite materials as suggested in FIGS. 2 and 3. The blade track segment 26 is held in place adjacent to tips of blades 15 to block combustion products from passing over the blades 15 without pushing the blades 15 to rotate. The blade track segment 26 is illustratively formed to include a runner 40 and the attachment portion 42 (sometimes referred to as the "attachment") as shown in FIGS. 3 and 4. The runner 40 extends partway around axis 11, while the attachment 42 extends radially outward from the runner 40 to provide structure for coupling the blade track segment 26 to the carrier segment 24. In the illustrative embodiment, the attachment 42 of the blade track segment 26 has a box shape that defines a channel 49.

In the illustrative embodiment, the brace 52 is located in the channel 49 formed by the attachment 42 of the blade track segment 26. The fastener 54 extends through the carrier segment 24 and the attachment 42 of the blade track segment 26 and engages the brace 52 in the channel 49. The fastener 54 then tightens to pull the brace 52 into engagement with the attachment 42 so that the blade track segment 26 is coupled to the carrier segment 24.

The attachment 42 includes a first radial wall 44, a second radial wall 45, and an attachment panel 46 as shown in FIGS. 3 and 4. The first and second radial walls 44, 45 extend radially outward from the runner 40. The second radial wall 45 is spaced apart axially from the first radial wall 44. The attachment panel 46 extends axially between the first and second radial walls 44, 45 to define the channel 49.

The attachment panel 46 is shaped to define a plurality of locating slots 51 as shown in FIGS. 3 and 4. The locating slots 51 are machined into a radially-outwardly facing surface 50 of the attachment panel 46. The locating slots 51 are configured to provide locating surfaces for the locating pads 36 of the carrier 24.

Turning again to the mounting system, the brace 52 includes a reaction panel 64 and a plurality of opposed track-location arms 60, 62 as shown in FIG. 4. The brace 52 extends at least circumferentially partway about the axis 11. Each first track-location arm 60 and the second track-location arm 62 engages a radially-inwardly facing surface 48 of the attachment panel 46 of the blade track segment 26. The reaction panel 64 extends at least partway about the axis 11 and circumferentially between the first and the second track-location arms 60, 62. The reaction panel 64 is shaped to include a hole 65 that extends radially there through in the illustrative embodiment.

In the illustrative embodiment, the first track-location arm 60 and the second track-location arm 62 acts as bias members that distribute loading along the attachment panel 46 of the blade track segment 26. The first and second track-location arms 60, 62 are also configured to support the blade track segment 26 relative to the carrier 24. The first and second track-location arms 60, 62 engage the attachment panel 46 of the blade track segment 26 and radially support the blade track segment 26.

The spring seal 56 includes an outer panel 86, a first spring arm 88, and a second spring arm 90 as shown in FIGS. 3-5. The outer panel 86 is arranged radially outward of the attachment panel 46 and extends axially along the radially-outwardly facing surface 50 of the blade track segment 26. The first spring arm 88 extends radially inward from the outer panel 86 and engages the first radial wall 44 of the blade track segment 26. The second spring arm 90 extends radially inward from the outer panel 86 and engages the second radial wall 45 of the blade track segment 26. The second spring arm 90 is spaced apart axially from the first spring arm 88 so that the attachment 42 is located axially between the first and second spring arms 88, 90.

In the illustrative embodiment, the outer panel 86 is shaped to include the radially-opening apertures 70 as shown in FIGS. 3-5. One of the radially-opening apertures 70 is sized to receive the fastener 54 in addition to the locating pad 36 in the illustrative embodiment.

A method of assembling the turbine shroud segment 22 may include several steps. The method includes arranging the brace 52 of the mounting system 28 in the channel 49 formed by the attachment 42 of the blade track segment 26 and arranging the spring seal 56 around the attachment 42 of the blade track segment 26. The spring seal 56 is arranged around the attachment 42 of the blade track segment 26 so that the first spring arm 88 engages the first radial wall 44 and the second spring arm 90 engages the second radial wall 45. The spring seal 56 is further arranged around the attachment 42 so that the radially-opening apertures 70 are also aligned with the locating slots 51 of the blade track segment 26.

Once the brace 52 and the spring seal 56 are assembled with the blade track segment 26, the attachment 42 of the blade track segment 26 is arranged in an attachment portion receiving space formed in the carrier segment 24. The blade track segment 26 is arranged within the space such that the locating pads 36 of the carrier 24 are aligned with the apertures 70 in the spring seal 56.

With the blade track segment 26 arranged in the space, the fastener 54 is inserted through the hole 35 in the carrier, one of the apertures 70 in the spring seal 56, and the hole 41 in the attachment 42 of the blade track segment 26 into the channel 49. The fastener 54 is then coupled to the brace 52 in the channel 49 by mating fastener 54 with the threads in the hole 65. The fastener 54 is then tightened to extend the locating pads 36 through radially-opening apertures 70 in the spring seal 56 so that the locating pads 36 engage the attachment portion 42 of the blade track segment 26.

Adjustable attachments, such as a bolted hanger system, are herein considered to help accommodate the poor (relative to more conventional turbine engine materials/fabrication processes) surface tolerance of the "as formed" ceramic matrix composite part can have on impacted interfaces in the design stack. Using this technique, control of the final placement of the part is transferred from the poorly controlled surface in a hard to reach area (such as the underside of a hanger) to a more accessible area that can be machined to a more tightly controlled tolerance (such as the outer surface of the same hanger).

As such, the present disclosure teaches a "nesting" arrangement, wherein the carrier segment 24 nests or extends through a portion of the mounting system 28 to engage the blade track segment 26. The nesting arrangement of the carrier segment 24 and the mounting system 28 allows the load path to be centered on the carrier segment 24, avoiding the unwanted rigid body motion, while at the same time minimizing the vertical space claim requirement.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment adapted for use in a gas turbine engine, the turbine shroud segment comprising a carrier segment comprising metallic materials, a blade track segment comprising ceramic matrix composite materials, the blade track segment formed to include a runner shaped to extend partway around a central axis and an attachment having a first radial wall that extends radially outward from the runner, a second radial wall spaced apart axially from the first radial wall that extends radially outward from the runner, and an attachment panel that extends axially between the first radial wall and the second radial wall to define a channel, and a mounting system configured to couple the blade track segment to the carrier segment, the mounting system including a brace located in the channel of the attachment and configured to distribute coupling and pressure loads applied to the blade track segment, a fastener that extends through the carrier segment and the attachment panel into the channel and mates with the brace to couple the blade track segment to the carrier segment, and a spring seal arranged between the carrier segment and the attachment of the blade track segment and engaged with the first and second radial walls of the attachment to block gases from flowing between the carrier segment and the blade track segment, wherein the carrier segment includes a plurality of locating pads that each extend radially inwardly through corresponding radially-opening apertures formed in the spring seal to directly contact the blade track segment and radially locate the blade track segment relative to the brace.

2. The turbine shroud segment of claim 1, wherein the attachment panel of the blade track segment is shaped to include a plurality of locating slots that each extend radially into a radially-outwardly facing surface of the attachment panel and the plurality of locating slots are sized to provide locating surfaces for the plurality of locating pads.

3. The turbine shroud segment of claim 2, wherein the spring seal includes an outer panel arranged radially outward of the attachment panel, a first spring arm that extends radially inward from the outer panel and engages the first radial wall of the attachment of the blade track segment, and a second spring arm that extends radially inward from the outer panel opposite the first spring arm and engages the second radial wall of the attachment of the blade track segment.

4. The turbine shroud segment of claim 3, wherein the outer panel of the spring seal is shaped to include the radially-opening apertures.

5. The turbine shroud segment of claim 3, wherein one of the radially-opening apertures is sized to receive the fastener and one locating pad of the plurality of locating pads.

6. The turbine shroud segment of claim 1, wherein the plurality of locating pads are all spaced circumferentially from one another about the central axis.

7. The turbine shroud segment of claim 6, wherein at least one locating pad is spaced axially from another locating pad along the central axis.

8. The turbine shroud segment of claim 7, wherein the plurality of locating pads includes at least three locating pads.

9. The turbine shroud segment of claim 1, wherein the carrier segment includes a body plate that extends at least partway about the central axis and the body plate is shaped to define a radially-inwardly opening cavity that receives the attachment of the blade track segment and the spring seal.

10. A turbine shroud segment adapted for use in a gas turbine engine, the turbine shroud segment comprising
a carrier segment,
a blade track segment formed to include a runner shaped to extend partway around a central axis and an attachment shaped to define a channel that extends at least partway about the central axis, and
a mounting system configured to couple the blade track segment to the carrier segment, the mounting system including a brace located in the channel of the attachment and configured to distribute coupling and pressure loads applied to the blade track segment, a fastener that extends radially through the carrier segment and the attachment into the channel and couples to the brace to couple the blade track segment to the carrier segment, and a spring seal arranged between the carrier segment and the attachment of the blade track segment,
wherein the carrier segment includes a plurality of locating pads that each extend radially inwardly through corresponding radially-opening apertures in the spring seal to directly contact the blade track segment and radially locate the blade track segment relative to the brace.

11. The turbine shroud segment of claim 10, wherein the attachment of the blade track segment includes a first radial wall that extends radially outward from the runner, a second radial wall spaced apart axially from the first radial wall that extends radially outward from the runner, and an attachment panel that extends axially between the first and second radial walls to define the channel.

12. The turbine shroud segment of claim 11, wherein the attachment panel of the blade track segment is shaped to include a plurality of locating slots that each extend radially into a radially-outwardly facing surface of the attachment panel and the plurality of locating slots are sized to provide locating surfaces for the plurality of locating pads.

13. The turbine shroud segment of claim 11, wherein the spring seal includes an outer panel arranged radially outward of the attachment panel, a first spring arm that extends radially inward from the outer panel and engages the first radial wall of the attachment of the blade track segment, and a second spring arm that extends radially inward from the outer panel opposite the first spring arm and engages the second radial wall of the attachment of the blade track segment.

14. The turbine shroud segment of claim 13, wherein the outer panel of the spring seal is shaped to include the radially-opening apertures.

15. The turbine shroud segment of claim 10, wherein the plurality of locating pads are all spaced circumferentially from one another about the central axis.

16. The turbine shroud segment of claim 10, wherein at least one locating pad is spaced axially from another locating pad along the central axis.

17. The turbine shroud segment of claim 10, wherein the plurality of locating pads includes at least three locating pads.

18. A method comprising
providing a carrier segment, a blade track segment, and a mounting system configured to couple the blade track segment to the carrier segment, the blade track segment including a runner shaped to extend partway around a central axis and an attachment portion that extends radially outward from the runner, and the mounting system including a brace, a fastener, and a spring seal,
arranging the brace of the mounting system in a channel formed by the attachment portion of the blade track segment,
arranging the spring seal around the attachment portion of the blade track segment,
arranging the attachment portion of the blade track segment with the spring seal in an attachment portion receiving space formed in the carrier segment,
inserting the fastener through the carrier segment, the spring seal, and the attachment portion of the blade track segment and into the channel, and
coupling the fastener with the brace in the channel to extend locating pads formed in the carrier segment through radially-opening apertures in the spring seal so that the locating pads engage the attachment portion of the blade track segment.

19. The method of claim 18, wherein the attachment portion of the blade track segment includes a first radial wall that extends radially outward from the runner, a second radial wall spaced apart axially from the first radial wall that extends radially outward from the runner, and an attachment panel that extends axially between the first and second radial walls to define the channel.

20. The method of claim 19, wherein the attachment panel of the blade track segment is shaped to include a plurality of locating slots that each extend radially into a radially-outwardly facing surface of the attachment panel and the plurality of locating slots are sized to provide locating surfaces for the locating pads.

* * * * *